(12) United States Patent
Mirfakhraei et al.

(10) Patent No.: US 8,144,807 B2
(45) Date of Patent: Mar. 27, 2012

(54) CROSSTALK CANCELLATION IN DIGITAL SUBSCRIBER LINE COMMUNICATIONS

(75) Inventors: Khashayar Mirfakhraei, Fremont, CA (US); Youngjae Kim, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1274 days.

(21) Appl. No.: 11/830,072

(22) Filed: Jul. 30, 2007

(65) Prior Publication Data

US 2009/0034592 A1 Feb. 5, 2009

(51) Int. Cl.
*H04K 1/02* (2006.01)
*H04L 25/49* (2006.01)

(52) U.S. Cl. ........ 375/296; 375/299; 375/260; 375/144; 375/146

(58) Field of Classification Search .................. 375/295, 375/296
See application file for complete search history.

(56) References Cited

U.S. PATENT DOCUMENTS

| | | | | |
|---|---|---|---|---|
| 3,903,377 A * | 9/1975 | Sato | ......................... | 379/406.11 |
| 5,237,538 A * | 8/1993 | Linville et al. | ................... | 367/38 |
| 5,832,032 A * | 11/1998 | Overbury | ...................... | 375/285 |
| 5,870,432 A * | 2/1999 | Kerckhove | ..................... | 375/232 |
| 5,949,796 A * | 9/1999 | Kumar | ............................ | 370/529 |
| 5,995,567 A | 11/1999 | Cioffi et al. | | |
| 6,459,739 B1 | 10/2002 | Vitenberg | | |
| 6,683,913 B1 | 1/2004 | Kantschuk | | |
| 6,954,505 B2 | 10/2005 | Gatherer et al. | | |
| 6,999,504 B1 | 2/2006 | Amrany et al. | | |
| 2001/0050987 A1 * | 12/2001 | Yeap et al. | ................ | 379/399.01 |
| 2008/0267055 A1 * | 10/2008 | Starr | ............................. | 370/201 |

OTHER PUBLICATIONS

ITU-T G.992.1, "Asymmetric digital subscriber line (ADSL) transceivers" (International Telecommunication Union, Jun. 1999).

* cited by examiner

*Primary Examiner* — Kenneth Lam
*Assistant Examiner* — Qutbuddin Ghulamali
(74) *Attorney, Agent, or Firm* — Steven A. Shaw; W. James Brady; Frederick J. Telecky, Jr.

(57) ABSTRACT

A digital subscriber line (DSL) modem that has a canceller digital filter for cancelling crosstalk and RF interference in a received DSL signal is disclosed. The modem includes common-mode sense circuitry and also differential-mode sense circuitry. Samples of the common-mode signal are acquired during a "quiet" period of initialization of the DSL modem, and samples of the differential-mode signal are acquired during live transmission of a DSL signal. An estimate of an autocorrelation function is obtained from the common-mode samples, and a cross-correlation of the common-mode samples and differential-mode samples is also estimated. Digital filter coefficients are derived from these estimates, based on the assumption that the common-mode samples acquired during the "quiet" phase represent crosstalk and RF interference present during differential-mode communications. The digital filter coefficients can also be updated during showtime of the DSL link, using an expanded number of samples of the common-mode and differential-mode signals.

4 Claims, 7 Drawing Sheets

CROSSTALK CANCELLATION IN DIGITAL SUBSCRIBER LINE COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to noise cancellation techniques in received digital communications.

Digital Subscriber Line (DSL) technology has become a primary technology providing high-speed Internet access, and now video and telephone communications, in the United States and around the world. As is well known in the art, DSL communications are carried out over existing telephone "wire" facilities, between individual subscribers and a central office (CO) location, operated by a telephone company or an Internet service provider. Typically, some if not all of the length of the loop between the CO and the customer premises equipment (CPE) consists of conventional twisted-pair copper telephone wire. Remarkably, modern DSL technology is able to carry out extremely high data rate communications, even over reasonably long lengths (e.g., on the order of 15,000 feet) of twisted-pair wire, and without interfering with conventional voiceband telephone communications, carried out over the twisted-pair wire simultaneously with the DSL data communications.

Modern DSL communications achieve these high data rates through the use of multicarrier modulation (MCM) techniques, more specifically discrete multitone modulation (DMT), by way of which the data signals are modulated onto orthogonal tones, or subcarriers, within a relatively wide frequency band (on the order of 1.1 MHz for conventional ADSL, and on the order of 2.2 MHz for ADSL2+), residing above the telephone voice band. The data symbols modulated onto each subchannel are encoded as points in a complex plane, according to a quadrature amplitude modulation (QAM) constellation. The number of bits of data that are carried over each subchannel (i.e., the "bit loading"), and thus the number of points in the QAM constellation for that subchannel, depend on the signal-to-noise ratio (SNR) at the subchannel frequency, which in turn depends on the noise and signal attenuation present at that frequency. For example, relatively noise-free and low attenuation subchannels may communicate data in ten-bit to fifteen-bit symbols, represented by a relatively dense QAM constellation with short distances between constellation points. On the other hand, noisy channels may be limited to only two or three bits per symbol, requiring a greater distance between adjacent points in the QAM constellation to resolve the transmitted symbol. The sum of the bit loadings over all of the subchannels in the transmission band for a DSL link of course amounts to the number of transmitted bits per DSL symbol for that link. And the data rate for DSL communications corresponds to the product of the symbol rate with the number of bits per DSL symbol.

FIG. 1 illustrates the data flow in conventional DSL communications, in a single direction (e.g., downstream, from a central office "CO" to customer premises equipment "CPE").

Typically, each DSL modem (i.e., both at the CO and also in the CPE) includes a transceiver (i.e., both a transmitter function and a receiver function), so that data is also communicated in the opposite direction over transmission channel LP according to a similar DMT process. As shown in FIG. 1, the input bitstream that is to be transmitted, typically a serial stream of binary digits in the format as produced by the data source, is applied to constellation encoder 11 in a transmitting modem 10. Constellation encoder 11 fundamentally groups the bits in the input bitstream into multiple-bit symbols that are used to modulate the DMT subchannels, with the number of bits in each symbol determined according to the bit loading assigned to its corresponding subchannel, based on the characteristics of the transmission channel as mentioned above. Encoder 11 may also include other encoding functions, such as Reed-Solomon or other forward error correction coding, trellis coding, turbo or LDPC coding, and the like. The symbols generated by constellation encoder 11 correspond to points in the appropriate modulation constellation (e.g., QAM), with each symbol associated with one of the DMT subchannels. Following constellation encoder 11, shaping function 12 derives a clip prevention signal included in the encoded signals to be modulated, to reduce the peak-to-average ratio (PAR) as transmitted as described in commonly assigned U.S. Pat. No. 6,954,505, issued Oct. 11, 2005, and incorporated herein by this reference.

These encoded symbols are applied to inverse Discrete Fourier Transform (IDFT) function 13, which associates each symbol with one subchannel in the transmission frequency band, and generates a corresponding number of time domain symbol samples according to the Fourier transform. As known in the art, cyclic insertion function 14 appends a cyclic prefix or suffix, or both, to the modulated time-domain samples from IDFT function 13, and presents the extended block of serial samples to parallel-to-serial converter 15. Cyclic insertion function 14 may follow rather than precede parallel-to-serial converter 15 in the transmission sequence, in some implementations. In either case, the time-domain serial sequence, as may be upsampled (not shown) as appropriate, is applied to digital filter function 16, which processes the datastream in the conventional manner to remove image components and voice band or ISDN interference. The filtered digital datastream signal is converted into the analog domain by digital-to-analog converter 17. After conventional analog filtering and amplification (not shown), the resulting DMT signal is transmitted over a channel LP, over some length of conventional twisted-pair wires, to a receiving DSL modem 20, which, in general, reverses the processes performed by the transmitting modem to recover the input bitstream as the transmitted communication.

At receiving DSL modem 20, analog-to-digital conversion 22 converts the filtered analog signal into the digital domain, following which conventional digital filtering function 23 is applied to augment the function of pre-conversion receiver analog filters (not shown). A time domain equalizer (TEQ) (not shown) may apply a finite impulse response (FIR) digital filter to effectively shorten the length of the impulse response of the transmission channel LP. Frame alignment function 24 receives the sequence of filtered digital samples, and arranges these samples into frames, by removing the cyclic extension from each block of samples, and by performing serial-to-parallel conversion to apply a block of samples (2N) to Discrete Fourier Transform (DFT) function 27. DFT function 27 recovers the modulating symbols at each of the subchannel frequencies, by reversing the IDFT performed by function 12 in transmission. The output of DFT function 27 is a frequency domain representation of the transmitted symbols multiplied by the frequency-domain response of the effective transmission channel. Frequency-domain equalization (FEQ) function 28 divides out the frequency-domain response of the effective channel, recovering the modulating symbols, each representable as a point in a QAM constellation. Constellation decoder function 29 then resequences the symbols into a serial bitstream, decoding any encoding that was applied in the transmission of the signal and producing an output bitstream that corresponds to the input bitstream upon which the transmission was based. This output bitstream is then forwarded to the client workstation, or to the central office network, as appropriate for the location.

As evident from the foregoing description, the data rate attained in such DSL communications is limited by the noise present on the various subchannels, because the bit loading of each subchannel depends on the signal-to-noise ratio at that subchannel frequency. As is well known in the art, the effects of "crosstalk" dominate the noise in modern DSL links. Crosstalk is, of course, noise present on one communications link that results from the coupling, to that link, of signals and noise from other communications links in the physical vicinity. So-called "near-end" crosstalk (NEXT) is crosstalk noise on received signals that originates from the same end of the cable at which the receiver is located (i.e., noise from communications in the opposite direction from the received signals), either on a neighboring cable or facility or resulting from transmissions by the same modem receiving the noise-corrupted signal. "Far-end" crosstalk (FEXT), on the other hand, is crosstalk noise coupling onto one link from other links in the physical vicinity, carrying communications in the same direction (i.e., upstream or downstream) as the received signal of concern. Indeed, crosstalk and other interference will often dominate the true signal being carried over the DSL link, at a ratio of tens of dB.

As known in the art, most telephone systems bundle multiple twisted pairs into a single "binder", with a given binder and the wire pairs it contains disposed between the same two points. For example, a binder may carry multiple twisted pairs deployed between a central office (CO) and a neighborhood distribution frame. Of course, the close proximity of twisted pairs within a common binder is a typical source of crosstalk among the signals carried by those twisted pairs.

FIG. 2 illustrates the architecture of a conventional DSL communications system. At central office CO, DSL modem 30 communicates on one side with routers connected to Internet service providers or other servers, in the conventional manner. CO modem 30, for example if based on the AC7 ADSL Infrastructure Chipset available from Texas Instruments Incorporated, can support up to sixteen separate DSL links, four of which are shown in FIG. 2 in this example as supported by a corresponding one of DSL modem ports $35_0$ through $35_3$. Each DSL modem port $35_0$ through $35_3$ communicates with a respective customer premises equipment (CPE) modem $40_0$ through $40_3$, respectively, over a corresponding twisted-pair wire facility $TWP_0$ through $TWP_3$. In this conventional example, twisted-pair wire facilities $TWP_0$ through $TWP_3$ are "bonded" into a single physical binder B, with twisted-pair wire is used for the entire loop length from the CO to the CPE.

Of course, other twisted-pair wire facilities besides those supported by DSL modem 30 at the CO may also be included within the same binder B; indeed, binder B may carrier twisted pairs from other central offices. Furthermore, as well known in the art, the CO will typically also combine other signals onto the same twisted pair facilities TWP. Commonly, voice telephone signals ("plain old telephone service", or "POTS") are also carried by twisted-pair wire facilities TWP, at frequencies below those of the downstream (CO-to-CPE) and upstream (CPE-to-CO) DSL data communications.

By way of further background, as known in the art, the data signals communicated over twisted-pair wire facilities TWP according to conventional DSL communications are differential mode signals, in that the information is conveyed by the voltage difference between the two wires in the twisted-pair. In contrast, the common mode voltage of the wires in the twisted-pair (i.e., the absolute voltages of the wires relative to a reference voltage, or ground) does not carry information. Conventional "analog front-end" or "AFE" circuits at the interface between CO modem 30 and CPE modem 40 and the twisted-pair TWP are designed to reject common-mode "signals", which in this application are purely noise (no information being by the common-mode voltages). Ideally, this common-mode rejection is perfect, such that the differential mode signal can be recovered regardless of the common mode voltage on the twisted-pair, and regardless of variations of that common mode over time. However, there is generally some amount of coupling of common-mode noise onto the differential mode signal in modern DSL installations. This coupling, along with the non-ideal common-mode rejection of modern AFE circuits, results in common-mode noise appearing in the differential-mode signal. In typical DSL installations, the ratio of common-mode to differential-mode in received signals is on the order of 60 dB.

It has been observed, in connection with this invention, that crosstalk interference (of both the FEXT and NEXT type) appears both as noise in the differential-mode, and also as common-mode noise. In addition, it has been observed that other interferers in DSL communications, such as narrow-band radio-frequency (RF) interferers, also appear as both common-mode and differential-mode noise.

BRIEF SUMMARY OF THE INVENTION

It is therefore an object of this invention to provide circuitry and a corresponding method for cancellation of cross-talk and narrow-band interference in a digital subscriber line (DSL) environment.

It is a further object of this invention to provide such circuitry and such a method in which such interference can be characterized both during initialization of the DSL link, but also during communication of actual payload traffic (i.e., "showtime").

It is a further object of this invention to provide such circuitry and such a method that can be readily implemented without requiring additional hardware.

It is a further object of this invention to provide such circuitry and such a method that can be implemented at modest additional cost.

It is a further object of this invention to provide an efficient realization of such circuitry and such a method that is compatible with current and existing DSL standards.

Other objects and advantages of this invention will be apparent to those of ordinary skill in the art having reference to the following specification together with its drawings.

The present invention may be implemented into a digital interference cancellation function at the receiving side of either or both central office (CO) or customer premises equipment (CPE) modems in a digital subscriber line (DSL) data communications system. During one or more "quiet" phases of the DSL initialization sequence in which no differential-mode signals are transmitted, the received signals are interpreted as common-mode noise and interference. Samples of this common-mode signal are digitized and stored in memory, as are samples of the differential-mode received signal during transmission. A digital filter is then implemented, with filter coefficients derived from an estimate of an autocorrelation function of the common-mode noise, and an estimate of a cross-correlation of the common-mode samples with the differential-mode signal. The digital filter constructed in this manner is applied to the received showtime signal after analog-to-digital conversion, to remove the effects of crosstalk and RF interference prior to demodulation.

According to another aspect of this invention, after an initial determination of the canceller digital filter coefficients, a larger number of samples of the received digitized common-mode and differential-mode signals are stored. The filter coefficient determination process is repeated on this larger sample size, based on the assumption that the actual payload signal is not correlated with the cross-talk or RF interference (i.e., thus treating the received signal as noise for purposes of analysis). The noise canceller digital filter coefficients can thus be updated to account for new interferers that have come on line after DSL initialization. Retraining of the DSL link is not required.

DETAILED DESCRIPTION OF THE INVENTION

The present invention will be described in connection with its preferred embodiment, namely as implemented into digital subscriber line (DSL) modulator/demodulator (modem) equipment, and methods of operating the same according to the asynchronous digital subscriber line (ADSL) communications protocols. However, it is contemplated that that this invention will also be beneficial in other loop-based communications systems and protocols in which cross-talk and RF interference limits the signal-to-noise ratio. Accordingly, it is to be understood that the following description is provided by way of example only, and is not intended to limit the true scope of this invention as claimed.

Figure 1:
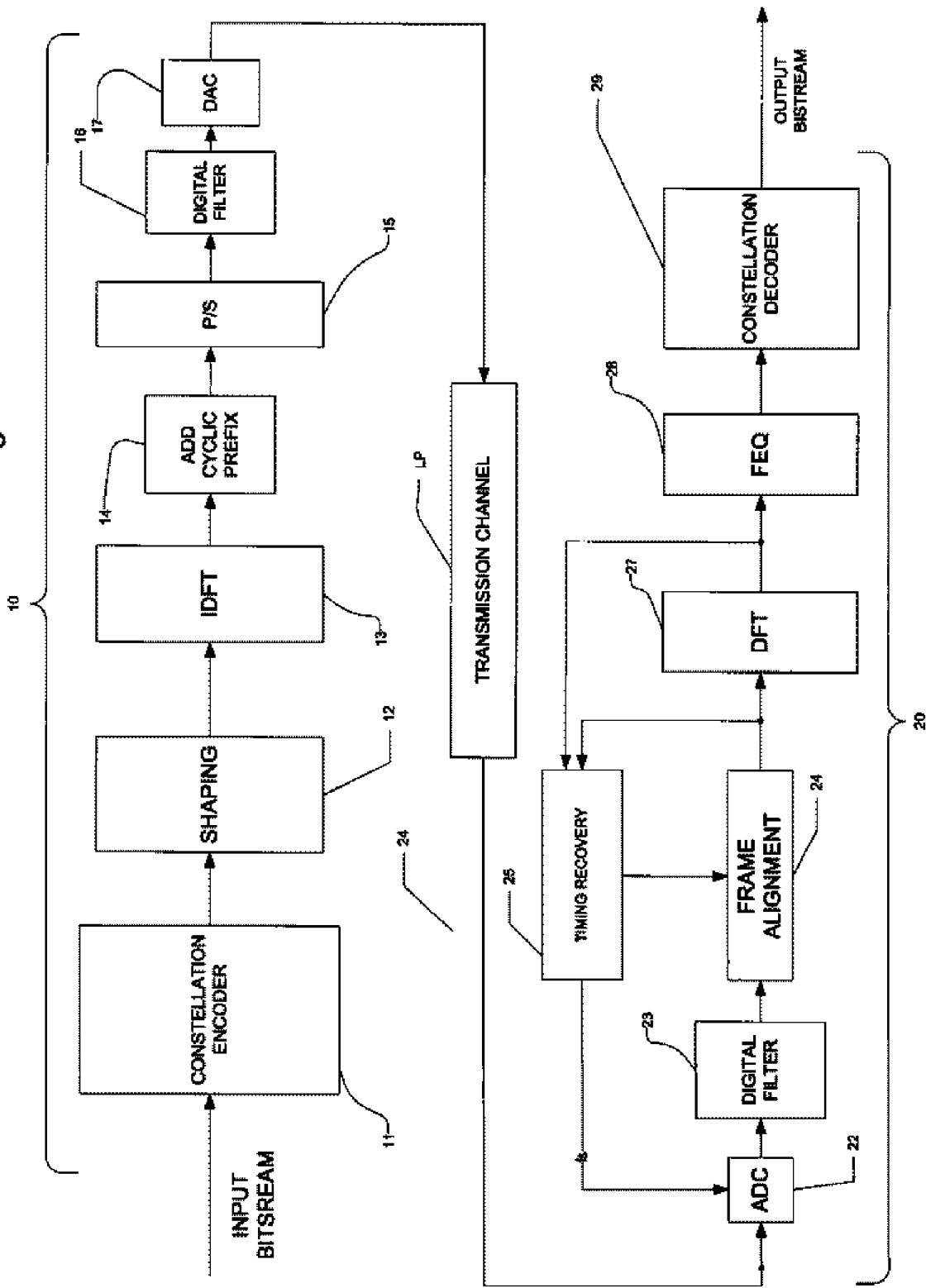
FIG. 1 is a functional diagram, in block form, illustrating conventional DSL communications, in one direction by way of example.
Figure 2:
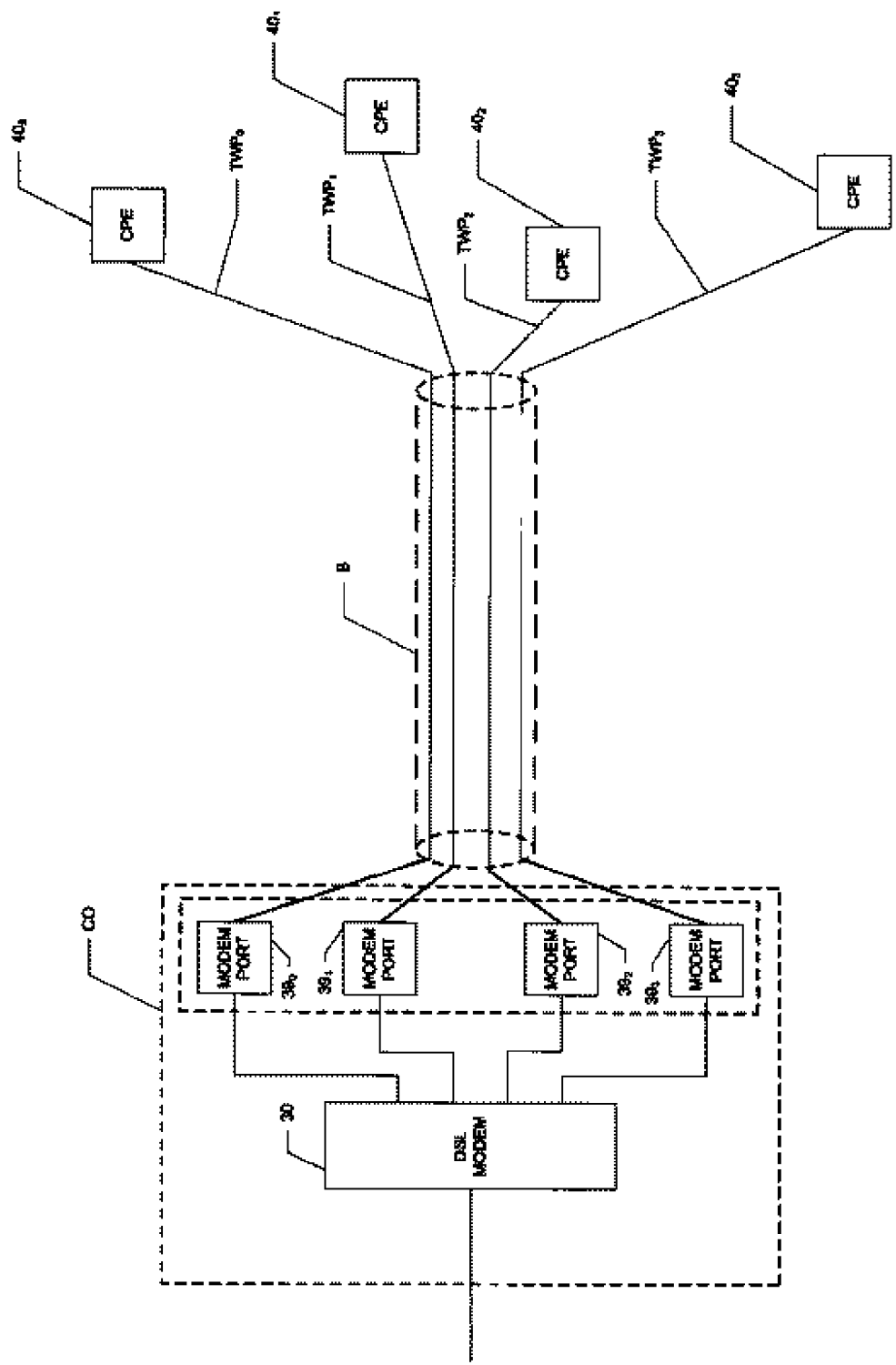
FIG. 2 is an electrical and functional diagram, in block form, illustrating the construction of a conventional DSL system in which multiple twisted-pair wire facilities share a common binder.
Figure 3:
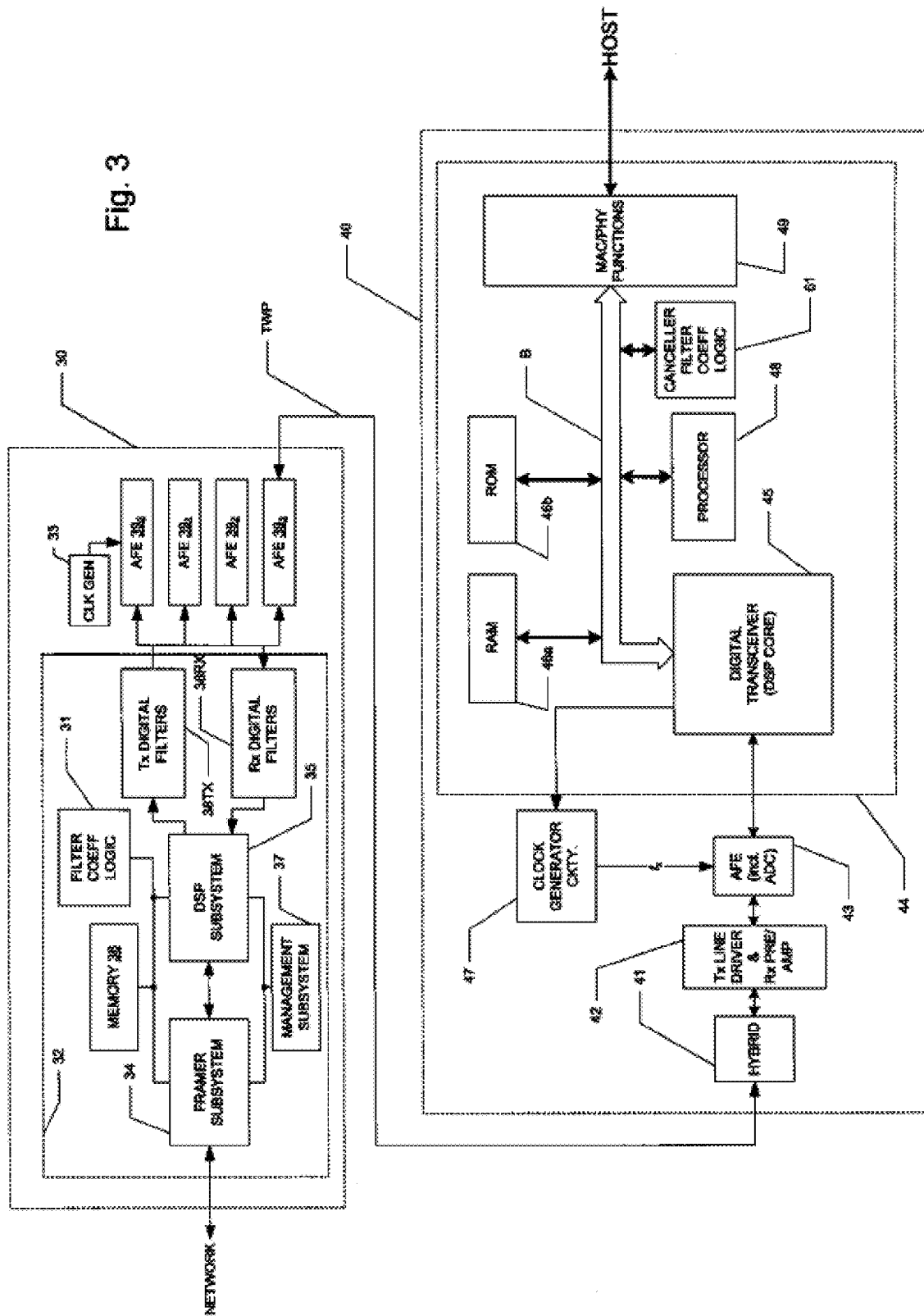
FIG. 3 is an electrical diagram, in block form, of the construction of DSL modems in communication in a DSL communications session, according to the preferred embodiment of the invention.

Referring first to FIG. 3, the construction of an example of central office (CO) modem 30 and customer premises equipment (CPE) modem 40 in a DSL communications link will now be described, by way of example. The architectures of CO modem 30 and CPE modem 40 illustrated in FIG. 3 correspond to modern implementations of these transceiver systems, as will be evident from the following description. However, those skilled in the art having reference to this specification will readily comprehend that CO modem 30 and CPE modem 40 can be realized by way of other alternative architectures from those shown and described in this specification, and that the architectures shown and described in this specification are presented by way of example only.

CO modem 30 in this example is based on the AC7 ADSL Infrastructure Chipset available from Texas Instruments Incorporated. As such, CO modem 30 includes transceiver 32, which may be realized by way of the TNETD7160 sixteen-port single-chip transceiver available from Texas Instruments Incorporated; in this example, only four ports are shown as coupled to transceiver 32, by way of analog front-end functions $39_0$ through $39_3$, for the sake of clarity.

Transceiver 32 in this example includes framer subsystem 34, which is a programmable logic function that communicates with the network functions within the central office, and that manages the conversion of network data into and out of the frames used in DSL communications, in the conventional manner. Management subsystem 37 is also provided within transceiver 32, for managing the operation of transceiver 32, including the generation of the necessary system clock signals, interfaces to the user or to host equipment including CO modem 30, power management, and the like. Transceiver 32 also includes DSP subsystem 35, which is programmable logic in the form of a programmable digital signal processor, and which manages DSL transmit functions including constellation encoding, spectral shaping, and inverse DFT modulation, and which also manages DSL receive functions including DFT demodulation, FEQ, and constellation decoding. It is contemplated that DSP subsystem 35 will be realized by a DSP core of sufficient computational capacity to perform these DSL modulation and coding functions for the ports supported by transceiver 32; an example of such a powerful core corresponds to the C62x family of digital signal processors available from Texas Instruments Incorporated. Memory 36 is provided within transceiver 32 for program and data storage as appropriate for the operation of transceiver 32, such program storage including storage of the instruction sequences used in performing the functions described in this specification, according to the preferred embodiment of the invention. CO modem 30 also includes timing recovery functionality, so that sampling of the upstream transmissions can be precisely and accurately gathered, by way of its clock generator circuitry 33, which generates sample clocks for the analog-to-digital conversion in each of AFEs 39, under the control and adjustment of signals from DSP subsystem 35.

DSP subsystem 35 communicates modulated data to be transmitted to transmit digital filters 38TX, while the data to be demodulated by DSP subsystem 35 are received via receive digital filters 38RX. Digital filters 38TX, 38RX are coupled to each of analog front-end functions $39_0$ through $39_3$, in this example. Digital filters 38TX, 38RX may also be performed by DSP subsystem 35, depending on the computational capacity available. According to this preferred embodiment of the invention, crosstalk and interference in the signals received by CO modem 30 will be canceled by receive digital filters 38RX, with the filter coefficients determined by canceller filter coefficient logic 31 in transceiver 32. Alternatively, these coefficients may be determined by DSP subsystem 35 or other programmable logic within CO modem 30. Receive digital filters 38RX may also apply one or more other digital filter functions to the received signal, as conventional in the art.

Each of analog front-end functions 39 includes the conventional analog functions such as a hybrid coupler for bidirectionally coupling to conventional twisted-pair telephone wire, a line driver and a receiver preamplifier for transmit and receive amplification, respectively, analog filters for both the transmit and receive signals, and also a conventional codec (coder/decoder). Digital-to-analog conversion and analog-to-digital conversion functions are also included within analog front-end functions 39, in the conventional manner. An example of a suitable integrated analog front-end function 39 is the TNETD7122 dual-channel integrated front-end, available from Texas Instruments Incorporated.

In this example, analog front-end function $39_3$ is coupled to twisted-pair wire facility TWP, which carries DSL downstream and upstream communications between CO modem 30 and CPE modem 40 in the DSL link shown in FIG. 3 in this example. In CPE modem 40, hybrid coupler 41 is connected to twisted-pair wire facility TWP to maintain separation of upstream signals from downstream signals, and in turn is coupled to transmit line driver and receive preamplifier function 42. Analog front-end function 43 is coupled to line drive and preamplifier function 42, and includes the necessary analog filters, codec, and digital-to-analog conversion (and vice versa) as used for DSL communications in the conventional manner. An example of a suitable analog front-end function 43 for CPE modem 40 is the AFE1302 ADSL analog front-end available from Texas Instruments Incorporated.

In this example, CPE modem 40 includes transceiver 44, which is realized in an architecture corresponding to the AR7 single-chip ADSL transceiver, available from Texas Instruments Incorporated; other suitable architectures and realizations for transceiver 44 in CPE modem 40 include the UR8 residential gateway product family available from Texas Instruments Incorporated. In the example of FIG. 3, transceiver 44 includes digital transceiver function 45, coupled to analog front-end function 43 via the appropriate interface. Digital transceiver function 45 is preferably realized as a DSP core with sufficient computational capacity to perform DSL transmit functions including constellation encoding, spectral shaping, and inverse DFT modulation, and to perform DSL receive functions including digital filtering of the received signal, DFT demodulation, FEQ, and constellation decoding. Examples of DSP cores suitable for digital transceiver function 45 include those in the C62x family of digital signal processors available from Texas Instruments Incorporated. Digital transceiver function 45 is coupled to random access memory (RAM) 46a, and read-only memory (ROM) 46b within transceiver 44 via bus B. ROM 46b and RAM 46a of course provide program and data storage, respectively, as appropriate for the operation of transceiver 44. It is contemplated that ROM 46b will include program memory storing the instruction sequences used in performing the functions described in this specification, according to the preferred embodiment of the invention. Clock generator circuitry 47 is also included within CPE modem 40, for generating sample clock $f_s$ that is applied to the analog-to-digital conversion (ADC) function of AFE 43. This sample clock $f_s$ is generated and adjusted based on signals from digital transceiver 45, according to conventional techniques.

According to this preferred embodiment of the invention, a digital filter for cancelling crosstalk and interference in the received signal is also performed by digital transceiver 45, with the digital filter coefficients for this cancellation determined by canceller filter coefficient logic 61 within digital transceiver 45. Canceller filter coefficient logic 61 (as well as canceller filter coefficient logic 31 in CO modem 30) may be "hard-coded" to perform the functions involved in determining these coefficients samples of the received signal as will be described in detail below, or alternatively may be programmable logic executing program instructions stored in program memory (e.g., ROM 46b) to perform those functions. As shown in FIG. 3, canceller filter coefficient logic 61 is coupled to bus B, to have access to the memory resources of RAM 46a and ROM 46b. Alternatively, the determination of the digital filter coefficients for this cancelling of crosstalk and interference may be carried out by digital transceiver 45 itself, or by other programmable logic within transceiver 44 of CPE modem 40 (e.g., processor 48 described below). Transceiver function 45 may also apply other digital filters to the received sampled signal, in the conventional manner.

Transceiver 44 also includes processor 48, which is responsible for management of the operation of transceiver 44, in the conventional manner. According to the AR7 architecture mentioned above, processor 48 may be realized as a thirty-two-bit MIPS microprocessor. Processor 48 is coupled to bus B, as is MAC/PHY function block 49, which performs the higher layer functions on the data to be transmitted and that received over the DSL link, and communicates that data to and from a host system. The specific interfaces for communication with the host system, and with other functions at the location of CPE modem 40 (especially if CPE modem 40 serves as a router, or as a residential gateway for telephone and other services), may also be provided in CPE modem 40, but are not shown in FIG. 3 for the sake of clarity.

As mentioned above, the particular architectures and implementation details described above and shown in FIG. 3 are presented by way of example only. Variations to and substitutes for these modem implementations and architectures may alternatively be used, without departing from the scope of this invention.

Figure 4:
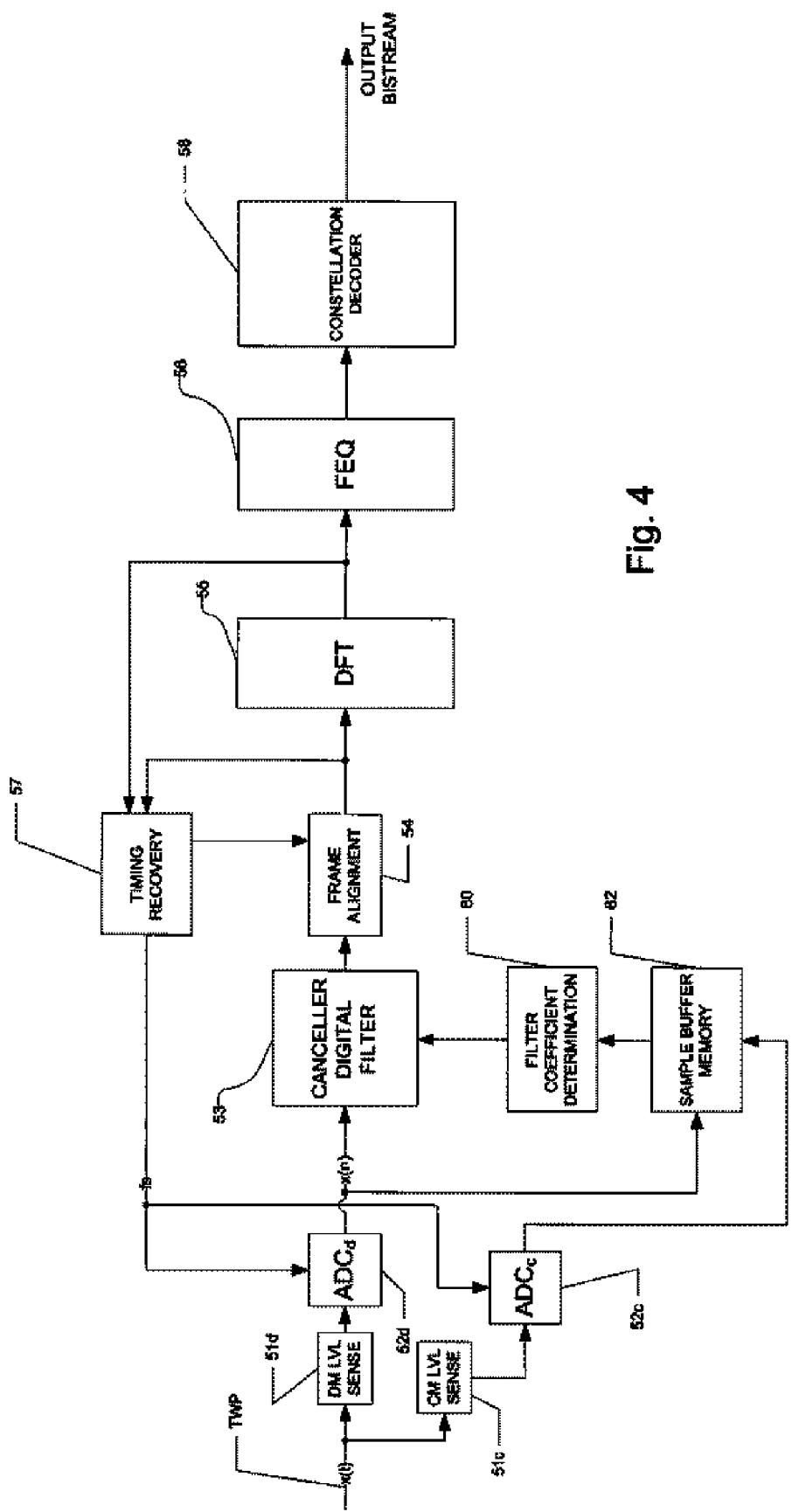
FIG. 4 is a functional diagram, in block form, illustrating the construction and operation of receive functions in a DSL modem according to the preferred embodiment of the invention.

Referring now to FIG. 4, the operation of the receive side of CPE modem 40, according to the preferred embodiment of the invention, will now be described. This description of the preferred embodiment of the invention will be described in connection with the receipt and noise cancellation of downstream traffic (rather than upstream traffic), because the more stringent demand on data rate and bit loading presented by downstream traffic renders the preferred embodiment of this invention especially beneficial as applied to that context. However, as mentioned above, this invention is also equally applicable to cancelling noise, crosstalk, and interference in received upstream traffic, and as such is also preferably realized in CO modem 30 as well. Furthermore, the implementation of the preferred embodiment of the invention at one end of the DSL link (e.g., at CPE modem 40) does not require or necessitate any changes or difference in operation for the modem at the other end of the link (e.g., at CO modem 30). As such, the preferred embodiment of this invention may be implemented either at the CO or in CPE, independently from its implementation at the other end of the potential or actual DSL link.

FIG. 4 illustrates the functional construction of the receive side of CPE mode 40 according to this preferred embodiment of the invention. As discussed immediately above, it is contemplated that this functionality will be realized by programmable digital logic executing program instructions, to the extent that these functions are carried out in the digital domain; as such, it is contemplated that the functions of FIG. 4 will primarily be carried out by digital transceiver 45 of CPE modem 40 in this downstream example (and by DSP subsystem 35 of CO modem 30 for upstream traffic). Of course, it is also contemplated that custom logic and other hardware may also be implemented within CPE modem 40 (and CO modem 30, as the case may be) for cancelling noise and interference according to this preferred embodiment of the invention, or that alternatively other programmable logic separate from that used in demodulation of the received data streams may perform that function. Those skilled in the art having reference to this description will be readily able to realize this functionality according to these, and other, implementations and architectures.

The data path illustrated in FIG. 4 includes differential mode level sense circuit 51d, which senses the differential signal x(t) in the analog domain, after such analog filtering as is conventionally implemented in CPE modem 40. Circuit 51d may be implemented by way of a conventional differential amplifier with a reasonable common-mode rejection ratio, such that common-mode voltages on the filtered differential signal do not significantly affect the analog signal applied by circuit 51d to analog-to-digital converter (ADC) function 52d. ADC 52d in turn samples the analog differential-mode signal synchronously with sample clock $f_s$, to produce sample sequence x(n). Sample sequence x(n) is then applied to canceller digital filter 53, according to this invention, which applies a digital filter function to cancel noise and interference from the sequence x(n). In particular, as will be described in further detail below, the preferred embodiment of this invention is particularly directed to adaptively deriving filter coefficients for canceller digital filter 53, so that it effectively cancels, from the received sequence x(n), the effects of crosstalk interference and other non-random interference such as that caused by one or more narrowband RF interferers in the vicinity of twisted-pair facility TWP. Other digital filter functions may also be included within canceller digital filter 53, such other applied digital filtering corresponding to conventional digital processing of received traffic in DSL modems.

Following canceller digital filter 53, the filtered signal sequence is converted and grouped into "windows" by frame alignment function 54, for application of a Fast Fourier Transform (FFT) by DFT demodulator function 55. Frame alignment function 54 also comprehends and removes the cyclic extension, if any. The demodulated frequency domain data z(p) produced by DFT function 55 is then applied to frequency domain equalizer (FEQ) 56, for recovery of an estimate of an originally transmitted data sequence s(p) by applying the inverse of an estimate of the channel response function. Timing recovery function 57 generates sample clock $f_s$ based upon analysis of the received sequence before and after demodulation by DFT function 55, in the conventional manner.

According to this preferred embodiment of the invention, samples x(n) of the received and digitized differential mode signal are stored in sample buffer memory 62. In addition, according to this embodiment of the invention, twisted-pair facility TWP is also connected to common mode level sense circuit 51c (after analog filtering, not shown in FIG. 4), which senses the common mode levels over time, and produces a corresponding analog signal that is sampled and digitized by ADC 52c, also synchronously with sample clock $f_s$. These common-mode samples acquired by ADC 52c are also stored in sample buffer memory 62.

Alternatively, a single ADC could be used to sample both the common-mode and differential-mode signals, for example in a time-multiplexed fashion. However, it is preferred from a circuit complexity standpoint to implement dedicated common-mode and differential-mode ADCs, to avoid the switching that would otherwise be required.

Samples acquired by ADCs 52c, 52d and stored in sample buffer memory 62 are processed by filter coefficient determination function 60, which derives the appropriate digital filter coefficients for canceller digital filter 53 to cancel crosstalk and other RF interference in the received signal, prior to demodulation by DFT function 55. As discussed above, filter coefficient determination function 60 is preferably carried out by canceller filter coefficient logic 61 in transceiver 44 of CPE modem 40, in this downstream example (and, for upstream traffic, by canceller filter coefficient logic 31 in transceiver 32 of CO modem 30). Alternatively, programmable logic may be provided to perform function 60, or may be implemented by way of digital transceiver 45 (or DSP subsystem 35, as the case may be). Furthermore, it is contemplated that sample buffer 62 may be realized within the resident data memory of the modem or transceiver (e.g., RAM 46a of transceiver 44 in CPE modem 40; memory 36 of transceiver 32 in CO modem 30), or alternatively by way of a separate hardware buffer outside of system memory space.

Figure 5:
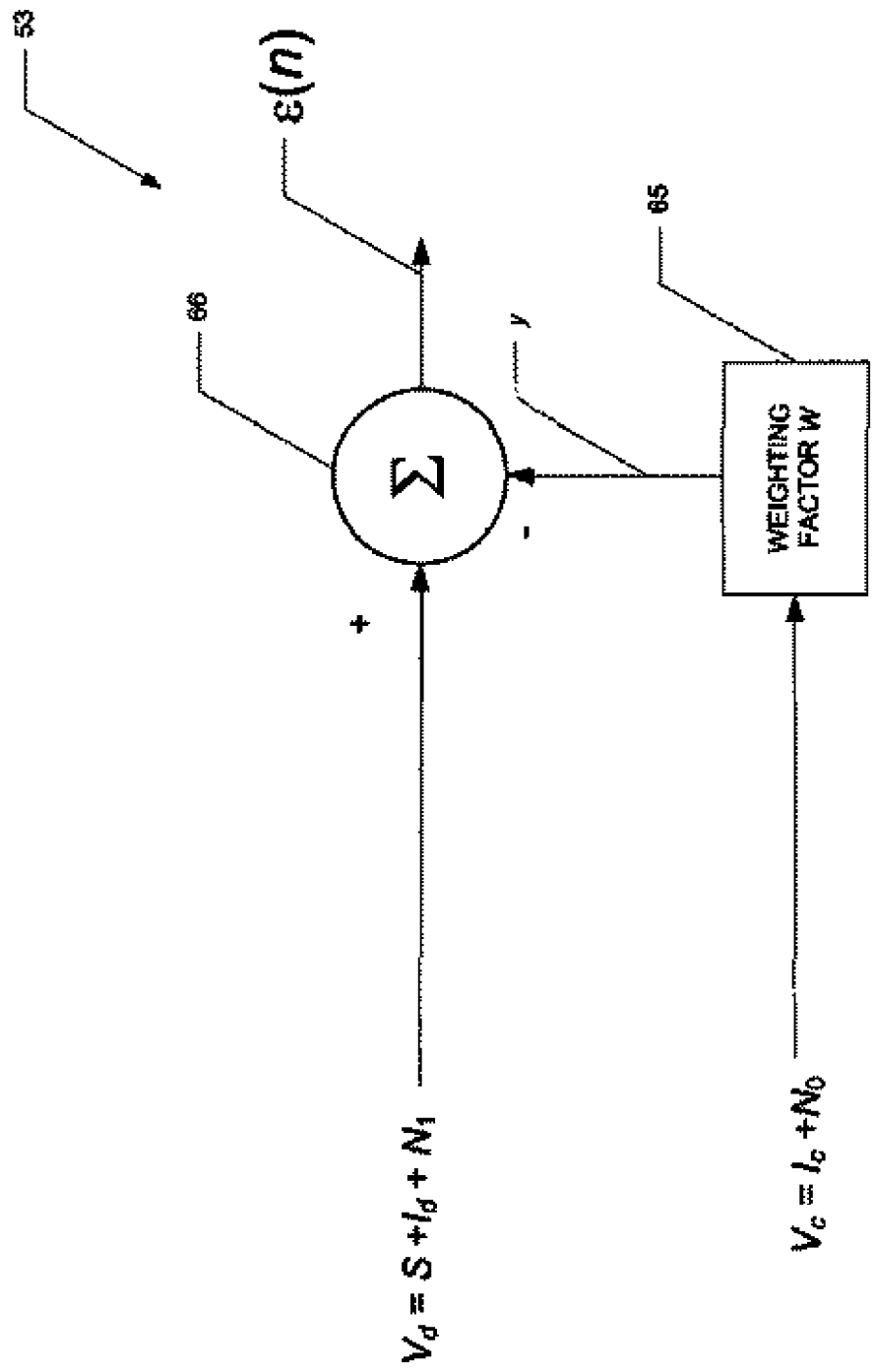
FIG. 5 is a schematic diagram illustrating the function of the canceller digital filter, according to the preferred embodiment of the invention.

FIG. 5 illustrates the theory of operation of canceller digital filter 53, according to this embodiment of the invention. In this example, the received differential-mode signal $V_d$ is considered to consist of signal S (i.e., the desired signal to be demodulated), differential mode interference $I_d$, and random noise $N_1$. Similarly, the received common-mode digitized sequence $V_c$ can be considered to consist of common-mode interference $I_c$ and random noise $N_0$; no signal component S is present in the common-mode portion of the received signal V (which is defined as the component sum $V_d+V_c$), because the desired signal S is purely a differential-mode signal in DSL communications. According to this invention, the common-mode interference $I_c$ and differential mode interference $I_d$ are considered to be correlated to one another, because these signal components originate from the same source of crosstalk or RF interference. The other signals S, $N_0$, $N_1$ are safely assumed to be independent of one another, and of common-mode interference $I_c$ and differential mode interference $I_d$.

According to the preferred embodiment of the invention, canceller digital filter 53 is intended to apply weighting factor W to the common-mode signal component $V_c$ in process 65, with the weighted common-mode signal component Wy then subtracted from the differential mode signal component $V_d$ by sum function 66. Weighting factor W is selected by filter coefficient determination function 60 to minimize the error term $\epsilon(n)$ output by sum function 66, for example in a minimum-mean-squared-error (MMSE) sense, which in turn minimizes the interference energy present in the output of canceller digital filter 53.

In theory, one can analyze the MMSE term $E[\epsilon^2]$ from the output of sum function 66 as:

$$E[\varepsilon^2] = E[(V_d - Wy)^2]$$
$$= E[(S + I_d + N_1 - W(I_c + N_0))^2]$$
$$= E[S^2] + E[N_1^2] + W^2 E[N_0^2] + E[(I_d - WI_c)^2]$$

considering signals S, $N_0$, $N_1$ as independent from one another and from the correlated signals ($I_d$, $I_c$), and considering all of these signals as having zero mean. In modem DSL systems, as mentioned above, the crosstalk and other interference $I_c$ dominates random noise $N_0$ in the common mode, and therefore one can express the MMSE error as:

$$E[\varepsilon^2] = E[S^2] + E[N_1^2] + E[(I_d - WI_c)^2]$$

As discussed above, the goal of canceller digital filter 53 is to minimize the MMSE error:

$$\min E[\epsilon^2] = E[S^2] + E[N_1^2] + \min E[(I_d - WI_c)^2]$$

Accordingly, the goal of canceller digital filter 53 is to minimize the difference of the differential mode interference $I_d$ with the common mode interference $I_c$ as weighted by weighting factor W. In other words, canceller digital filter 53 seeks to weight common mode interference $I_c$ by selection of weighting factor W, so that it equals the differential mode interference $I_d$. Filter coefficient determination function 60 thus has the task of deriving this weighting factor W, in the form of digital filter coefficient values.

Figure 6:
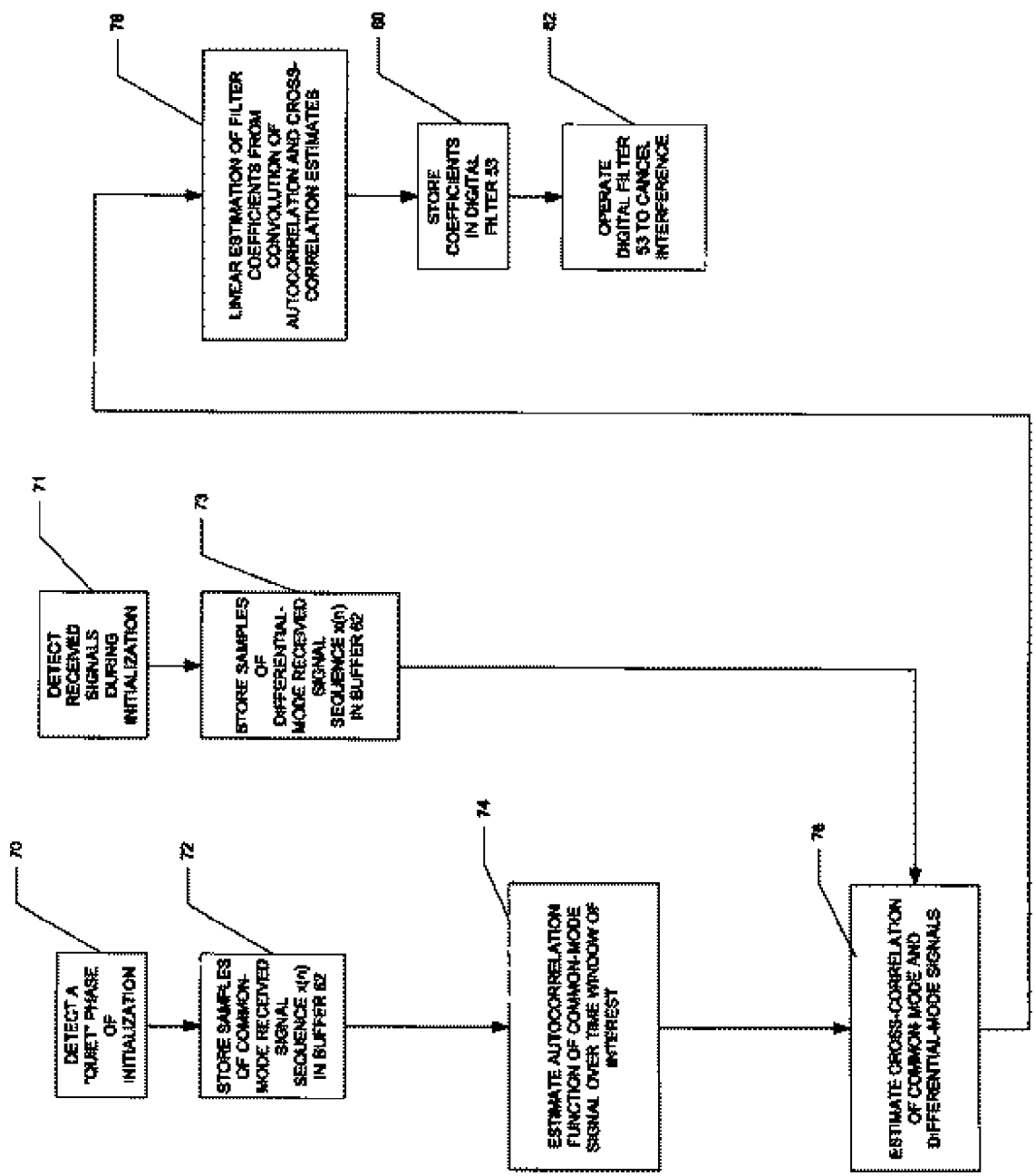
FIG. 6 is a flow diagram illustrating the operation of the initialization of a canceller digital filter according to the preferred embodiment of the invention.

Referring now to FIG. 6, the operation of canceller filter coefficient logic 61 of CPE modem 40 in carrying out filter coefficient determination function 60 of FIG. 4 will now be described, by way of example. The process of FIG. 6 illustrates the determination of coefficients for canceller digital filter 53 in connection with initialization of the DSL link between CO modem 30 and CPE modem 40, it being understood that similar operations can be performed within CO modem 30 for upstream traffic.

In process 70, receiving CPE modem 40 detects "quiet" mode operation in the initialization of the DSL link. As known in the art, for example as described in the ADSL standard ITU-T G.992.1, "Asymmetric digital subscriber line (ADSL) transceivers" (International Telecommunication Union, June 1999), such standard incorporated herein by this reference, such "quiet" operation is present within various phases of DSL initialization. For example, during the transceiver training phase of initialization, "quiet" mode operation includes a sequence in which CO modem 30 presents zero-volt differential output "signals" for a duration of between 128 symbols and 2048 symbols, and CPE modem 40 presents zero-volt differential output "signals" for a duration of between 128 symbols and 8000 symbols, overlapping the zero-volt differential output by CO modem 30. Other "quiet" periods may also be present during conventional DSL initialization. During such "quiet" operation, no differential voltage signals are driven by either CO modem 30 or CPE modem 40 over twisted-pair facility TWP. According to this invention, the state of twisted-pair facility TWP during such "quiet" periods is assumed to be due to common-mode noise and interference only.

According to this embodiment of the invention, therefore, and in response to the detection of this "quiet" mode, common mode level sense circuit 51c and ADC 52c acquire samples of the common mode levels at twisted-pair facility TWP, and transceiver 44 stores those digitized common-mode samples in buffer 62. As discussed above, those stored samples provide a good indication of the common-mode noise, and thus an indication of the crosstalk and RF interference in the current environment of twisted-pair facility TWP, because there is no differential-mode signal being driven at this time. According to this embodiment of the invention, this estimate of the crosstalk and RF interference from the samples of the received common-mode signal during "quiet" mode is used to derive the filter coefficients for canceller digital filter 53 that minimizes the MMSE error at its output, as described above in connection with FIG. 5.

Similarly, in process 71, transceiver 44 detects an active phase during initialization during which actual signals are transmitted by CO modem 30 and received by CPE modem 40. For example, during the transceiver training phase of initialization according to the ADSL G.992.1 standard, CO modem 30 transmits various pseudo-random patterns over twisted-pair facility TWP, such as the REVERB signal. In this DSL environment, these signals are purely differential-mode signals. In process 73, sense circuit 51d and ADC 52d acquire samples of differential mode signals during such an active phase, and transceiver 44 stores these samples in buffer 62, such samples representative of differential-mode signals that will be received during showtime. It is contemplated that the number of samples acquired for purposes of deriving these canceller filter coefficients will be in the hundreds of samples, for both the common-mode and differential-mode signals.

In process 74, the derivation of the canceller filter coefficients begins with an estimation of the autocorrelation function for the common mode signal from the samples acquired by common mode level sense circuit 51c and ADC 52c, and stored in process 72. This process 74 is performed by canceller filter coefficient logic 61 in transceiver 44 of CPE modem 40, in this example. An example of a suitable discrete numerical method for performing this convolution essentially follows the "xcorr" MATLAB toolbox instruction, in which the autocorrelation function is performed by discrete convolution of the sequence of stored common-mode samples with itself. Process 74 also limits its resulting autocorrelation estimate to a time window of interest, for example by identifying the point having the maximum output value, and selecting a number of points n that is equal to the number of taps in canceller digital filter 53, on either side of that maximum point in the convolution sequence. The resulting autocorrelation vector $R_{cc}$ is then stored in a memory resource, such as a portion of buffer 62.

In process 76, digital transceiver 45, processor 48, or other programmable logic in CPE modem 40, in this example, estimates a cross-correlation function of the common-mode signal corresponding to the samples stored in process 72, with the differential-mode signal corresponding to the samples stored in process 73. In this example, discrete convolution of the common mode samples stored in process 72 with the differential mode samples stored in process 73 is performed, preferably over hundreds of samples of each. An example of a suitable discrete numerical method for performing this convolution essentially follows the "xcorr" MATLAB toolbox instruction. In this preferred embodiment of the invention, the resulting convolution sequence is then limited to a time window of interest, again by identifying the maximum value point in the convolution sequence, and selecting that point along with a number of points n equal to the number of taps in canceller digital filter 53 on either side of that maximum point in the sequence. The resulting cross-correlation vector $R_{cd}$ is then stored in buffer 62 or another memory resource, and is an estimate of extent to which common-mode crosstalk and RF interference couples into the differential-mode signal.

Once the autocorrelation and cross-correlation vectors are estimated in processes 74, 76, respectively, programmable logic in transceiver 44 now estimates the filter coefficients for canceller digital filter 53, in process 78. Based on fundamental linear estimation theory, and referring to FIG. 5, weighting factor W is a vector of these filter coefficients, having a number of entries corresponding to the number of taps n of canceller digital filter 53, and determined in process 78 by:

$$W = R_{cd} * R_{cc}^{-1}$$

which is effectively the convolution of n-element cross-correlation vector $R_{cd}$ with an n-by-n matrix formed as inverse of the autocorrelation matrix $R_{cc}$. According to this preferred embodiment of the invention, the n-by-1 cross-correlation vector $R_{cd}$ is the right-hand half of the full cross-correlation vector produced in process 76 from the maximum point forward in the sequence. The inverse autocorrelation matrix $R^{-1}_{cc}$ is derived by first swapping the left-half and right-half sides of the auto-correlation vector produced in process 74, and then creating a Toeplitz matrix based on this swapped vector. Following their formation, n-element cross-correlation vector $R_{cd}$ is multiplied by the inverse autocorrelation matrix $R^{-1}{}_{cc}$ to derive the n-element weighting factor vector W. As such, process 78 can be carried out according to conventional matrix and vector operations, as known in the art. According to this embodiment of the invention, vector W constitutes the n filter coefficients of canceller digital filter 53, and these coefficients are stored in digital filter 53 in process 80. For example, it is contemplated that fifty taps will be suitable to attain reasonable cancellation of wideband crosstalk in modem DSL links; if the interference encountered is dominated by a narrowband RF interferer, however, fewer taps in canceller digital filter 53 may be adequate.

Canceller digital filter 53 is then ready to process received signals after conversion into the analog domain by ADC 52 (FIG. 4). According to this preferred embodiment of the invention, as indicated by process 82 of FIG. 6 and according to FIG. 5, this processing of signals determines an estimate of the common-mode signal (i.e., the crosstalk and RF interference) by applying canceller digital filter 53 to the received signal to derive an estimate y of the extent of the common-mode signal that is present in the received differential-mode signal (process 65 of FIG. 5) and then subtracting that estimate y from the received signal itself (sum function 66 of FIG. 5).

Figure 7:
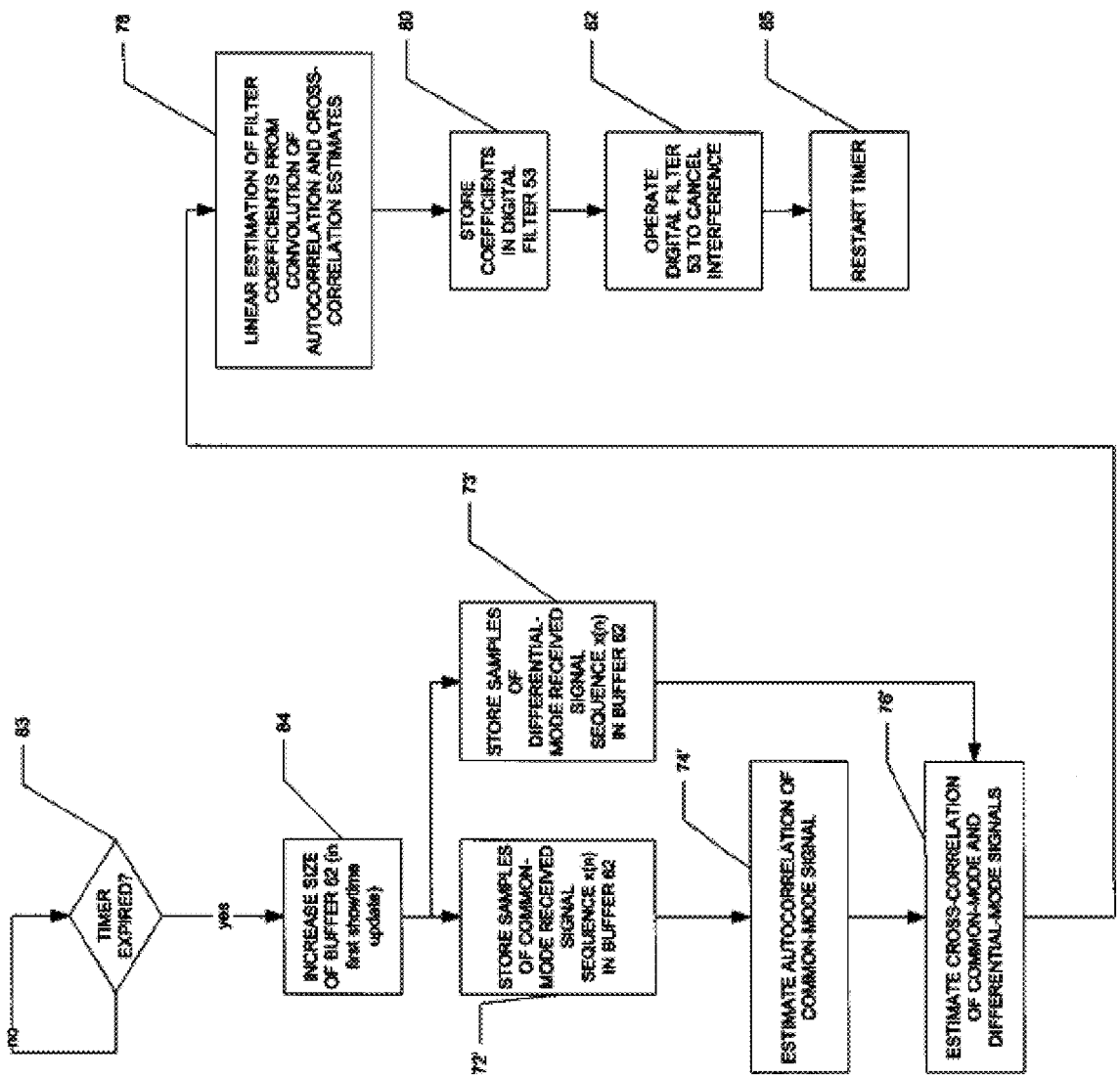
FIG. 7 is a flow diagram illustrating the operation of updating of the coefficients of the canceller digital filter during showtime of a DSL session, according to the preferred embodiment of the invention.

According to the preferred embodiment of the invention, canceller digital filter 53 can also, and optionally, be updated during showtime to account for changes in the link environment, such as the entry of new crosstalk or RF interferers into that environment, without requiring retraining or reinitialization of the DSL session. Referring now to FIG. 7, a procedure for such updating during a live DSL communications session according to the preferred embodiment of the invention will now be described, with the same reference numerals referring to equivalent processes in the initial coefficient determination procedure of FIG. 6.

It is contemplated that the updating of coefficients for canceller digital filter 53 will be performed periodically. As such, according to this embodiment of the invention, decision 83 determines whether a specified time period since the last update of canceller digital filter 53 coefficients was performed; if not (decision 83 is NO), a timer or equivalent function (e.g., digital loop counter) in transceiver 44 is checked again later. Alternatively or in addition, the updating of these filter coefficients may be initiated upon a particular event, such as the detection of a certain number or frequency of errored received cells.

In this embodiment of the invention, upon expiration of the specified time period (decision 83 is YES) or such other event indicating updating of the coefficients ought to be performed, the area of sample buffer 62 allocated to storing common-mode and differential-mode samples is increased from that used during initialization. It is also contemplated that the number of taps in canceller digital filter 53 will also be increased from that used during initialization, given the reduced accuracy of this procedure because of the absence of a "clean" common-mode signal. As indicated in FIG. 7, the allocation of sample buffer 62 is necessarily increased in size only for the first showtime update; later updates of the coefficients during showtime can continue to use this increased allocation. This increase in the allocation of buffer 62, and the corresponding increase in the number of samples taken during showtime, is performed because of the absence of any "quiet" period during which the samples can be assumed to correspond to the common-mode crosstalk and interference. Rather, the updating process of FIG. 7 relies on the observation that the true differential-mode signal during showtime is not correlated with the common-mode interference. As such, the showtime differential-mode signal can be considered as "noise" to the common-mode "signal" (which is itself, in fact, interference), for purposes of updating the coefficients of canceller digital filter 53. Because of the presence of this "noise" on the common-mode signal, it is preferred that a greater number of samples be analyzed according to this showtime procedure to ensure that the resulting filter coefficients are sufficient to provide adequate cancellation.

As such, in processes 72' and 73', this increased number of samples of the common-mode and differential-mode received sample signal sequences are stored in buffer 62. For example, if 200 samples are acquired and stored in buffer 62 for each of the common-mode and differential-mode sequences during initialization, the number of samples acquired and stored in buffer 73' during showtime may be as many as several thousand samples. For example, experiments have been performed according to this invention in which 50,000 samples were acquired, corresponding to two to three full DMT symbols at a sample rate $f_s$ of 70 MHz. As mentioned above, these common mode samples acquired by common mode level sense circuit 51c and ADC 52c also include some contribution from coupling of the differential mode signal.

In process 74', canceller filter coefficient logic 61 in transceiver 44 estimates an autocorrelation function for the common mode signal, from the samples acquired and stored in process 72'. As before, this estimate of the autocorrelation is derived by way of a discrete convolution operation executed by programmable logic in transceiver 44, applied to a sequence of the stored samples from process 72'. The resulting convolution is then limited to a meaningful time window by detecting the maximum value in the convolution sequence, and selecting that point and n other points on either side of that maximum, where n is the number of taps in canceller digital filter 53 (the number of taps n preferably being higher than the number of taps derived during installation). As described above, the common mode sample values stored in process 72' include contributions from the true differential-mode signal. Because the true transmitted differential-mode signal is uncorrelated with the common-mode interference, it is contemplated that the larger number of samples used in process 74' during showtime will be sufficient to extract a reasonable estimate of the autocorrelation of the common-mode interference.

In process 76', canceller filter coefficient logic 61 in transceiver 44 estimates the cross-correlation of the common-mode signal corresponding to the samples stored in process 72', with the differential-mode samples stored in process 73'. As before, cross-correlation process 73' preferably performs discrete convolution of the common mode samples stored in process 72 with the differential mode samples stored in process 73 is performed, over the increased number of samples of each. The resulting convolution sequence is then limited to a time window of interest, as before, by identifying the maximum value point in the convolution sequence, and selecting that point along with a number of points equal to the number of taps n in canceller digital filter 53 on either side of that maximum point in the sequence. The resulting cross-correlation vector $R_{cd}$ is then stored in buffer 62 or another memory resource, and is an estimate of extent to which common-mode crosstalk and RF interference couples into the differential-mode signal.

Once the autocorrelation and cross-correlation estimates are obtained for the showtime samples, in processes 74', 76', the remainder of the process can be completed in the same manner as described above relative to FIG. 6. Process 78 estimates the filter coefficient vector W in the same manner as performed during initialization, and the results of this new estimate are stored in canceller digital filter 53 in process 80, for use in subsequent showtime operation in process 82. Alternatively, the estimation of updated filter coefficients performed in process 78 may smooth changes to the filter coefficients, for example by incorporating a "learning factor" to adjust the coefficients in a time-weighted manner. In other words, the updated coefficients may be derived to equal the previous values, plus (or minus) some fraction of the difference between the updated values and the previous values. Other alternative algorithms for adjusting the filter coefficients may alternatively be implemented, as desired. In any case, digital filter 53 with its updated coefficients then begins the processing of incoming sample values x(n), prior to demodulation and other processing as described above. In process 85, the timer interrogated in decision 83 (or such other monitor of time or events over which the coefficient updating process is performed) is restarted.

As mentioned above, this description has been presented with reference to CPE modem 40, in its cancellation of noise, crosstalk, and RF interference from downstream DSL traffic. It is also contemplated that this invention may also be realized in CO modem 30, for determination and use of a canceller digital filter for removing crosstalk and other interference from upstream traffic in the DSL link.

According to the preferred embodiment of the invention, therefore, crosstalk and other RF interference in a differential DSL signal is effectively cancelled in the digital domain. This cancellation is effective both for wideband interference, such as that resulting from DSL or other communications crosstalk that has frequency components over the frequency bandwidth of the desired DSL signal, or wider, and also for narrowband RF interference, such as that caused by nearby radio signals or noise caused by other equipment in the vicinity of the binder. The training of the digital filter coefficients for cancelling this interference is completely compatible with the ADSL standards, and as such does not require any additional communication or procedure that necessarily involves the other side of the DSL link. As such, the cancellation function according to this preferred embodiment of the invention may be implemented on only one side of the DSL link if desired; for example, this invention may be implemented into CPE DSL modems and implemented by the DSL customer, without involving the DSL service provider. Furthermore, it is contemplated that this invention may be easily implemented into modems and other equipment, without the addition of substantial expense or manufacturing cost.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of cancelling interference in a differential mode discrete multitone modulation signal received at a receiver having at least a canceller digital filter, comprising:
    sampling common-mode levels of the received signal;
    sampling differential-mode levels of the received signal;
    storing common-mode and differential-mode sample values from the sampling steps in a memory resource;
    estimating an autocorrelation of the common-mode sample values, said estimating comprising:
        executing a convolution of a plurality of common-mode sample values with itself;
        identifying a maximum value of the convolution;
        storing an autocorrelation vector corresponding to a number of points on each side of the identified maximum value of the convolution in a memory resource;
    estimating a cross-correlation of the common-mode sample values with the differential-mode sample values, comprising:
        executing a convolution of a plurality of common-mode sample values with a plurality of the differential-mode sample values;
        identifying a maximum value of the convolution;
        storing a cross-correlation vector corresponding to a number of points on each side of the identified maximum value of the convolution in a memory resource;
    estimating canceller filter coefficients from a convolution of the estimated autocorrelation and the estimated cross-correlation, comprising:
        creating a Toeplitz matrix from the stored autocorrelation vector;
        performing a convolution of at least a portion of the stored cross-correlation vector with the Toeplitz matrix to produce a weighting factor vector;
        storing the weighting factor vector as coefficients for the canceller digital filter; and
    then operating the canceller digital filter using the estimated coefficients on samples of the received differential-mode discrete multitone modulation signal.

2. The method of claim 1, wherein the first step of sampling common-mode levels of the received signal is performed during a period in which no differential-mode discrete multitone modulation signal is received over the communications facility.

3. The method of claim 2, further comprising:
    performing an initialization procedure for a digital subscriber line communications session over the at the receiver having at least the canceller digital filter, wherein
    the step of sampling common-mode levels is performed during a quiet phase of the initialization procedure.

4. The method of claim 1, further comprising:
    demodulating the differential-mode discrete multitone modulation signal, after the step of operating the canceller digital filter.

* * * * *